Patented Jan. 6, 1948

2,433,876

UNITED STATES PATENT OFFICE 2,433,876

MATERIALS RESISTANT TO POISONOUS GASES

Raoul Wechsberg, deceased, late of Amsterdam, Netherlands, by J. C. A. Büchner, administrator, Amsterdam, Netherlands; vested in the Attorney General of the United States No Drawing. Application August 21, 1939, Serial No. 291,280. In the Netherlands August 27, 1938

4 Claims. (Cl. 117—161)

This invention relates to materials resistant to poisonous gases such as war gases and more particularly to mustard gas (dichlorodiethylsulfide) and other blistering gases, and to methods of producing such materials.

It is an object of the invention to provide a material from which garments, wall coverings etc., comprising a protective substance resisting the action of poison gases can be made.

Other objects of the invention will appear as the specification proceeds.

For the manufacture of garments resistive to poison gases only such materials can be used which possess permanent suppleness and elasticity, and which are not too heavy. An elastic material which is often employed for this purpose is rubber, which, however, offers a satisfactory protecting action only during a short time. A great number of substitutes and conversion products of rubber have also been proposed for this purpose, but really satisfactory results have not been attained as yet.

It has now been found that a very effective protection against poisonous gases can be obtained by spreading on a support which may be any flexible sheet material, for instance a textile fabric, at least one protective layer containing a substance which is capable of changing the chemical constitution of poison gases which may come in contact with it so as to convert them into harmless compounds, this substance being mixed with a material which is practically not affected by the poison gases nor by the reactive substance mentioned above.

Peroxides, a particularly effective representative of which is the peroxide of lead ($PbO_2$), which act as powerful oxidants, have been found to be particularly suitable for use in this mixture. As a permanently elastic material unaffected by such oxidants or by the poison gases may be used various polymerization products of hydrocarbons such as iso-butylene, a product sold under the trade name "Oppanol," or the well-known polyethylene chlorides, an example of the latter being polyvinyl chloride. These polymerization products have properties resembling those of rubber but are superior to ordinary rubber as will be explained hereinafter.

In the mixture containing the reactive substance such as lead peroxide and the permanently elastic material such as for instance poly-isobutylene, poly-isobutylene nitriles or polyethylene chloride suitable inorganic fillers such as talcum, kieselguhr or magnesium oxide and drying oils, resins, resin soaps, asphalt, glycerol, etc. may be present.

For instance, a mixture of poly-isobutylene with lead peroxide has been found to be particularly efficacious and to remain so during so long a protection period, for instance 8 to 9 hours as to be practically unaffected by the gases.

In the manufacture of poison gas-proof garments a layer of a mixture such as described above is applied to a supporting sheet material, for instance a textile fabric, by spreading it thereon either as such or in a solution, in any suitable manner. A thin coat of the mixture affords satisfactory protection during a period of several hours but obviously this period is increased in proportion to the thickness of the coat.

Between the supporting sheet and the protective layer and, if desired, also as a cover for this layer there may be arranged one or several layers of some other suitable material. For instance, the exposed face of the protective layer, the side of the supporting sheet (the textile fabric), to which the protecting mixture is applied, as well as the opposite side of the sheet, may be coated with an elastic material such as rubber or an elastic varnish.

Apart from textile materials, rubber, leather, paper, reinforced paper and the like may be used as supporting sheet material. If the protective mixture according to the invention and some other elastic substance, such as rubber or products of condensation or polymerization of organic compounds, are used in contact with each other, it may be useful to separate them by an intermediate layer formed of a mixture of the materials of these two layers.

The mixture may be applied in the form of a dispersion in a liquid, e. g. gasoline which is then volatilized. It may however also be applied by spreading, ironing, calendering, rubbing and the like. These operations may be carried out once or several times.

*Example*

For the purpose of gasproofing a fabric, 7500 kgs. polyisobutylene (Oppanol)
1500 kgs. $PbO_2$
1500 kgs. magnesium oxide (magnesia usta) and
3750 kgs. kieselguhr were used.

The procedure was as follows:

Start polyisobutylene on a mill, heated to approximately 50° C. and mill at friction speed, approximately six minutes, adding kieselguhr, Mill until the material is smooth on the rollers, then add magnesium oxide and as the last ingredient add the lead peroxide. Sheet out in thin sheets and soak in benzene during one night. Run in hoppers the next day, adding benzene, until a smooth satisfactory cement is obtained. This cement is spread in very thin layers on a fabric of suitable strength, taking care that the machine is hot enough to evaporate the benzene.

Care should be taken to run thin layers, depositing approximately 10 grams per square meter, since polyisobutylene remains liquid and is a slow-drying substance.

After running until enough weight is obtained, dust with French chalk and spread a number of coats on the reverse side.

Thereafter dust this side with French chalk.

Materials coated according to the invention or the gasproof garments made therefrom if contacted by a poisonous gas, can be cleaned (disinfected) by boiling without their efficiency being affected.

Various changes may be made in the details disclosed in the foregoing specification without departing from the invention or sacrificing the advantages thereof.

What is claimed is:

1. A material for use in the manufacture of mustard gas-protective garments and other coverings, comprising in combination with at least one flexible supporting sheet, a protective layer on at least one side of said sheet, which layer contains lead peroxide and a compound of hydrocarbons selected from a group consisting of poly-isobutylene, poly-isobutylene nitrile, and poly-ethylene chloride, the amount of lead peroxide being approximately 20% of the amount of hydrocarbon compound.

2. The method of producing a material for use in the manufacture of mustard gas-protective garments and coverings, which comprises applying to a flexible supporting sheet of fibrous material a mixture containing lead peroxide and a compound of hydrocarbons selected from a group consisting of poly-isobutylene, poly-isobutylene nitrile, and poly-ethylene chloride, the amount of lead peroxide being approximately 20% of the amount of hydrocarbon compound.

3. A material for use in the manufacture of mustard gas-protective garments and other coverings, comprising a flexible supporting sheet of material, carrying a coating of a composition comprising lead peroxide and an elastic artificial substance selected from a group consisting of poly-isobutylene, poly-isobutylene nitrile, and poly-ethylene chloride, the amount of lead peroxide present being approximately 20% of the amount of the elastic substance selected from the afore-mentioned group.

4. A material as defined in claim 3 wherein, said supporting sheet is made of rubber, and further comprising an intermediate layer of material disposed between the supporting sheet and protective layer, said intermediate layer consisting of a mixture of rubber and said protective layer.

J. C. A. BÜCHNER,
*Administrator of the Estate of Raoul Wechsberg, Deceased.*

REFERENCES CITED

The following references are of record in the file of this patent:

UNITED STATES PATENTS

| Number | Name | Date |
|---|---|---|
| 2,173,781 | Gibello | Sept. 19, 1939 |
| 2,132,711 | Voorhees | Oct. 11, 1938 |
| 2,061,570 | Frolich et al. | Nov. 24, 1936 |
| 2,227,516 | Soanes | Jan. 7, 1941 |
| 2,289,185 | Fisher | July 7, 1942 |

FOREIGN PATENTS

| Number | Country | Date |
|---|---|---|
| 292,813 | Great Britain | June 28, 1928 |
| 373,947 | Great Britain | June 2, 1932 |